United States Patent [19]

Agostinis et al.

[11] Patent Number: 5,164,455

[45] Date of Patent: Nov. 17, 1992

[54] LINEAR ALTERNATING-BLOCK COPOLYMERS

[75] Inventors: Enrico Agostinis, Milan; Sergio Custro, Ravenna; Alessandro Zazzetta, Cesena, all of Italy

[73] Assignee: Enichem Elastomeri S.p.A., Palermo, Italy

[21] Appl. No.: 780,126

[22] Filed: Oct. 21, 1991

Related U.S. Application Data

[63] Continuation of Ser. No. 431,996, Nov. 6, 1989, abandoned.

[30] Foreign Application Priority Data

Nov. 25, 1988 [IT] Italy ............... 22732 A/88

[51] Int. Cl.$^5$ ............... C08F 297/04; C08L 53/02
[52] U.S. Cl. ............... 525/314; 525/88; 525/93; 525/98; 525/99; 525/250; 525/271; 252/43
[58] Field of Search ............... 525/250, 271, 314

[56] References Cited

U.S. PATENT DOCUMENTS

| | | | |
|---|---|---|---|
| 3,431,323 | 3/1969 | Jones | 260/880 |
| 4,153,647 | 5/1979 | Glukhovskoi et al. | |
| 4,168,286 | 9/1979 | Moczygemba | 525/314 |
| 4,172,826 | 10/1979 | Haaf et al. | |
| 4,874,821 | 10/1989 | Agostinis et al. | |

FOREIGN PATENT DOCUMENTS 0209183 1/1987 European Pat. Off.
0270515 6/1988 European Pat. Off.
2207679 2/1989 United Kingdom.

*Primary Examiner*—James J. Seidleck
*Assistant Examiner*—Vasu S. Jagannathan
*Attorney, Agent, or Firm*—Shea & Gould

[57] ABSTRACT

Linear copolymers with four alternating blocks, represented by the following formula:

$$B_1-T-A_1-B_2-A_2$$

where: $A_1$ and $A_2$ are polyvinylaromatic blocks, $B_1$ and $B_2$ are blocks consisting of ethylene-butene-1 or ethylene-propylene copolymers, and T is a statistical terpolymer segment formed from ethylene-propylene-vinylarene or ethylene-butene-1-vinylarene monomer units.

The copolymers are characterized by a weight-average molecular weight of between 20,000 and 300,000 and a total content of vinylaromatic units of between 10 and 60% by weight. The ratio of the weight-average molecular weight of block $A_1$ to that of block $A_2$ is a number between 0.25 and 2.0, and the ratio of the weight-average molecular weight of block $B_1$ to that of block $B_2$ is a number between 0.05 and 0.5.

The copolymers exhibit an optimum balance of mechanical, rheological and thermo-oxidation resistance properties and can be obtained by hydrogenating block-copolymers of vinylaromatic monomers with conjugated diene monomers.

8 Claims, No Drawings

LINEAR ALTERNATING-BLOCK COPOLYMERS

This application is a continuation of patent application Ser. No. 07/431,996, filed Nov. 06, 1989, and now abandoned.

This invention relates to alternating-block copolymers having an optimum balance between mechanical, rheological, and thermo-oxidation resistance characteristics.

The invention also relates to the process for preparing these copolymers.

The known art is to subject suitable monomers to anionic living polymerization in the presence of an alkyl-metallic or aryl-metallic catalyst to obtain both linear and branched block polymers.

In recent years, block copolymers obtained by the copolymerization of conjugated diene monomers with vinylaromatic monomers, such as polybutadiene/polystyrene and polyisoprene/polystyrene block copolymers, have undergone considerable development. These copolymers can be used either in their original state, as anionic living synthesis products, or after their partial or total hydrogenation.

The requirement for hydrogenating the unsaturations contained in block copolymers, particularly those of the polydiene elastomeric phase, derives from the synthesis of the copolymers themselves, in that their stability is strongly dependent on the unsaturations contained in the diene block and is decidedly improved by their partial or total elimination.

In this respect, even partial hydrogenation of the unsaturations in the polydiene block results in a considerable increase in resistance to thermo-oxidation.

If the elastomeric block consists of linear polybutadiene, hydrogenation of said thermoelastomeric materials is not without drawbacks, due particularly to a reduction in the workability and thermoelastomeric characteristics of the hydrogenated polymer, in that hydrogenation results in a polyethylene block with mainly plastic characteristics.

This drawback has been overcome by carrying out the block copolymer synthesis with a block consisting of partially 1,2-linked polybutadiene. This is because hydrogenation of the polybutadiene vinyl unsaturations leads to the formation of poly(1-butene) units, so that the final structure of the hydrogenated elastomeric block is that of an ethylene-butene-1 statistical copolymer.

Examples of hydrogenated block copolymers obtained by hydrogenating block copolymers in which the elastomeric phase consists of partially 1,2-linked polybutadiene are reported in the patents U.S. Pat. No. 3,431,323, RE 27145 and GB 1,264,741.

However, even if partial or total hydrogenation of the diene unsaturations has enabled thermo-oxidation resistance to be increased, and the use of linkages of the aforesaid type has lessened the drawbacks of reduced workability and elastomeric characteristics of the polymer, the greater problem of providing the copolymers with a good balance between flow characteristics and mechanical properties still exists.

Thus, in the case of hydrogenated A—B—A (polystyrene-polydiene-polystyrene) three-block copolymers, the increase in thermooxidation resistance compared with the starting non-hydrogenated copolymer is accompanied by improved mechanical characteristics, which for this type of non-hydrogenated block copolymer are known to be satisfactory. However, the viscosity of the hydrogenated copolymer, both in its molten state and in solution, is higher than that of the non-hydrogenated copolymer, and this creates problems in workability and forming.

Even the known (AB)$_2$ four-block copolymers with mutually similar polybutadiene blocks, which have poor mechanical characteristics but good rheological characteristics, give products with poorer rheological characteristics on hydrogenation of the diene unsaturations.

Similar conditions apply to linear (AB)$_n$ multiblock copolymers, where n is a whole number between 3 and 10.

The object of the present invention is to obviate the aforesaid drawbacks of the known art.

In this respect, according to the present invention, it has been found that some linear block copolymers with alternating blocks of polystyrene and ethylene-butene-1 copolymer, or alternating blocks of polystyrene and ethylene-propylene copolymer, are able to demonstrate an unexpectedly good characteristics balance.

The following contribute in achieving the overall good characteristics displayed by the block copolymers of the invention: the linear structure, the type and distribution of the blocks, their alternation, the ratio of their lengths, and the type of terpolymer segment between the individual blocks. In accordance therewith, the present invention provides linear copolymers with four alternating blocks, represented by the following formula:

$$B_1—T—A_1—B_2—A_2$$

where: A$_1$ and A$_2$ are polyvinylaromatic blocks, B$_1$ and B$_2$ are elastomeric blocks consisting of ethylene-butene-1 or ethylene-propylene copolymers, and T is a statistical terpolymer segment formed from ethylene-propylene-vinylarene or ethylene-butene-1-vinylarene monomer units, having a weight-average molecular weight of between 20,000 and 300,000 and a total content of vinylaromatic units of between 10 and 60% by weight, in which the weight-average molecular weight of block A$_1$ varies from 0.25 to 2.0 times that of block A$_2$, and the weight-average molecular weight of block B$_1$ varies from 0.05 to 0.5 times that of block B$_2$.

In the preferred embodiment:

the blocks B$_1$ and B$_2$ are ethylene-butene-1 or ethylene-propylene statistical copolymers, and the blocks A$_1$ and A$_2$ are polystyrene blocks;

the weight-average molecular weight of the copolymer B$_1$—T—A$_1$—B$_2$—A$_2$ varies from 50,000 to 150,000;

the total content of vinylaromatic units varies from 30 to 40% by weight;

the weight-average molecular weight of block B$_1$ varies from 0.1 to 0.3 times that of block B$_2$; and the weight-average molecular weight of block A$_1$ varies from 0.5 to 1.5 times that of block A$_2$.

The described block copolymers according to the present invention find widespread use in the technical field, for example in adhesives and sealants, in compositions with bitumens, in engine lubricants and in mixture with other plastics materials such as polyolefins and most engineering polymers (such as polycarbonate, polyphenyleneoxide, ABS), of which they improve certain basic properties.

The applicant has found that the copolymers according to the present invention can be obtained by hydrogenating parent polymers prepared by anionic living polymerization of suitable monomers in an aliphatic or cycloaliphatic organic solvent at a temperature of between 30° and 150° C., at a pressure equal to or greater than atmospheric, in the presence of alkyl-metallic or aryl-metallic catalysts normally used in living polymer synthesis. Parent alternating-block copolymers able to form the block copolymers of the present invention after hydrogenation are in particular those described in a preceding patent application in the name of the present applicant (U.S. Pat. application Ser. No. 117,631).

The same patent application also indicates the methods for preparing them. Generally, the synthesis process for the parent copolymer, as therein described, is based on the following succession of operations:

in a first polymerization step, metered quantities of butadiene or isoprene and styrene mixed together are fed and polymerized in solution with a catalyst system suitable for the synthesis of living polymers, until the monomers have undergone complete or substantially complete conversion; in this manner a living copolymer is formed comprising two non-pure blocks $B_1$—$A_1$, i.e. joined together by a copolymer segment of statistically linked monomer units of butadiene or isoprene and styrene;

in a second step, butadiene or isoprene is fed in metered quantities to the product of the first step, said diene monomer then being polymerized in either the presence or absence of polar substances (such as ethers, amines), until complete or substantially complete conversion is obtained; in this manner a $B_1$—$A_1$—$B_2$ three-block living copolymer is obtained free or substantially free of a statistical copolymer segment between the blocks $A_1$ and $B_2$;

in a third step, styrene is fed in metered quantities to the product of the second step, said styrene then being polymerized until conversion is complete or substantially complete, to obtain the $A_1$—$B_1$—$A_2$—$B_2$ four-block copolymer free or at least substantially free of a copolymer segment between blocks $A_2$ and $B_2$.

This process is conducted under the general polymerization conditions described in the aforesaid patent application. In the preferred embodiment the process is carried out in n-hexane or cyclohexane as solvent, with lithium sec-butyl as catalyst, under adiabatic conditions, with the temperature progressively increasing from an initial value of about 50° C. to a final value of about 100° C.

The copolymer segment containing statistically linked butadiene or isoprene and styrene monomer units is present in a weight quantity of between 5 and 15% of the total polymer when operating under the aforesaid conditions.

In all cases, the reaction is extinguished by adding a suitable stopper which neutralizes the catalytic activity of the lithium, such as methanol, and the alternating four-block linear copolymer is recovered by normal separation means, for example by evaporating the solvent in a stream of steam and drying the solid residue from said evaporation.

By operating with the described procedure, linear copolymers of four alternating polydiene and polyvinylaromatic blocks are obtained which, when the unsaturations of the butadiene or isoprene units are selectively hydrogenated, provide the alternating-block saturated linear copolymers of the present invention.

Hydrogenation of the polymer according to the invention can be effected using any one of the known processes of the art for hydrogenating olefinic unsaturations, together with the corresponding catalysts.

For example, catalyst systems can be used based on nickel or cobalt carboxylates with aluminium alkyls, as described in the patents DE 1,924,745, U.S. Pat. No. 3,415,759, GB 1,156,346 and U.S. Pat. No. 3,531,450, or based on nickel or cobalt alcholates and aluminium alkyls as described for example in the patents U.S. Pat. No. 3,664,588 and U.S. Pat. No. 3,113,986, or the nickel acetylacetonate-aluminium trialkyl system described for example in the patents U.S. Pat. No. 3,415,759 and U.S. Pat. No. 3,700,748. Equally suitable for the purpose are catalyst systems based on aluminium and nickel diisopropylsalicylate, or on lithium alkyls or aryls described in the patents GB 1,030,306 and U.S. Pat. No. 3,541,064, or supported catalysts based on nickel and Raney nickel, copper chromite etc., as described for example in the patents U.S. Pat. No. 2,842,504, U.S. Pat. No. 2,864,809 and U.S. Pat. No. 3,023,201.

Whatever the chosen hydrogenation catalyst and/or process, it is very important that the hydrogenation conditions are not such as to cause the polymer to break down or become spent, in the sense of also resulting in total or partial hydrogenation of the aromatic centres of the parent copolymer.

To obtain hydrogenation only of the unsaturations of the butadiene or isoprene units, the procedure is carried out generally within a temperature range of between 30° and 200° C. and at a hydrogen pressure of between 28 and 1000 p.s.i.

In the preferred embodiment the temperature range is 50°–130° C. and the hydrogen pressure range 140–560 p.s.i.

The following experimental examples are given for illustration only, and do not limit the range of the present invention.

EXAMPLE 1

5 g of 1,3-butadiene (purity 99.5%), 15 g of styrene (purity 99.5%), 600 g of anhydrous n-hexane and 0.128 g of sec-butyllithium are fed in sequence into a 1000 ml insulated steel reactor fitted with a mechanical stirrer.

The mass is heated to 50° C., and after 40 minutes adiabatically attains a temperature of 75° C. Under these conditions the monomer conversion is practically complete.

4 g of tetrahydrofuran and 65 g of 1,3-butadiene are added to the polymer solution obtained and polymerization is effected for 20 minutes, during which the temperature rises spontaneously to about 95° C.

On termination, the butadiene conversion is practically complete. 15 g of styrene are added to the polymer solution obtained and polymerization is effected for 15 minutes, during which the temperature rises spontaneously to about 100° C. On termination, the styrene conversion is practically complete.

The characteristics of the polymer prepared in this manner are given in Table 1.

TABLE 1

| Styrene weight % | MW $\times 10^{-3}$ | Butadiene % 1,2 units |
|---|---|---|
| 30 | 52 | 37 |

The polymeric solution of the block copolymer is transferred under a hydrogen atmosphere into a 1200 ml insulated steel reactor which has been previously treated with hydrogen and fitted with a multi-blade mechanical stirrer, and the mass is heated to 60° C.

The polymeric solution is hydrogenated under a hydrogen pressure of 400 p.s.i. for 3 hours.

A catalyst mixture prepared by mixing 0.1 g of nickel acetylacetonate and 0.14 g of triethylaluminium in 10 ml of cyclohexane is added.

The degree of hydrogenation of the butadiene units, determined by iodometric titration, is 98.5%. The catalyst residue is then removed by extraction with dilute HCl followed by washing with water.

After washing, 0.2 g of 2,6-ditert.butyl-4-methylphenol anti-oxidant are added to the polymeric solution. The hydrogenated polymer is recovered by precipitation with a mixture of ethyl and methyl alcohol and dried in a vacuum oven at 60° C. for 24 hours.

EXAMPLE 2

The hydrogenated copolymer of Example 1 is used in the hot melt formulation given in Table 2.

TABLE 2

| Component | Parts by weight |
| --- | --- |
| Polymer | 100 |
| ESCPREX 5380 | 170 |
| PRIMOL 352 | 20 |
| IRGANOX 565 | 0.5 |
| IRGANOX 1076 | 0.5 |

Table 3 shows the main adhesive properties of the formulation of Table 2.

TABLE 3

| | |
| --- | --- |
| Brookfield viscosity at 140° C. (cps) | 90,000 |
| Brookfield viscosity at 160° C. (cps) | 35,000 |
| Brookfield viscosity at 180° C. (cps) | 10,000 |
| Brookfield viscosity at 180° C. after 2 days (cps) | 10,000 |
| Brookfield viscosity at 180° C. after 4 days (cps) | 10,000 |
| Polyken tack (g) | 160 |
| Peeling (g/2.5 cm; PSTC 1) | 1.500 |
| Holding power (g/2.5 cm; PSTC 7) | 85 |

EXAMPLE 3

10 g of 1,3-butadiene (purity > 99.5%), 20 g of styrene (purity 99.5%), 650 g of cyclohexane and 0.110 g of sec-butyllithium are fed in sequence into a 1000 ml insulated steel reactor fitted with a mechanical stirrer.

The mass is heated to 55° C., and after 20 minutes adiabatically attains a temperature of 81° C. Under these conditions the monomer conversion is practically complete.

3.8 g of tetrahydrofuran and 60 g of 1,3-butadiene are added to the polymer solution obtained and polymerization is effected for 20 minutes. On termination of the reaction the temperature is 100° C. and the butadiene conversion practically complete.

10 g of styrene are added to the polymer solution obtained and polymerization is effected for about 8 minutes, during which the temperature rises spontaneously to 107° C. The conversion is practically complete.

The characteristics of the polymer prepared in this manner are given in Table 4.

TABLE 4

| Styrene weight % | MW × $10^{-3}$ | Butadiene % 1,2 units |
| --- | --- | --- |
| 30 | 59 | 38 |

The solution of the polymer defined in Table 4 is transferred under a hydrogen atmosphere into a 1200 ml insulated steel reactor fitted with a multi-blade mechanical stirrer, and the mass is heated to 60° C.

A catalyst mixture prepared by mixing 0.15 g of nickel 2-ethylhexanoate and 0.18 g of diisobutylaluminiumhydride in 6 ml of n-hexane is added and the polymeric solution is hydrogenated under a hydrogen pressure of 400 p.s.i. for 3 hours.

The degree of hydrogenation of the butadiene units, determined by iodometric titration, is 98.0%.

The catalyst residue is then removed by extraction with an aqueous solution of $H_2O_2$ and acetic acid followed by washing with water. After washing, 0.25 g of 2,6-ditert.butyl-4-methylphenol anti-oxidant are added to the polymeric solution.

The hydrogenated polymer is recovered by precipitation with a mixture of ethyl and methyl alcohol and dried in a vacuum oven at 60° C. for 24 hours.

EXAMPLE 4

The hydrogenated polymer of Example 3 is used in the sealant mixture given in Table 5.

TABLE 5

| Component | Parts by weight |
| --- | --- |
| Polymer | 100 |
| REGALREZ 1018 | 250 |
| ENDEX 160 | 50 |
| INDOPOL H 300 | 20 |
| IRGANOX 1010 | 0.8 |
| TINUVIN 327 UV | 1.0 |
| SILANE Z6020 | 4 |

Table 6 shows the main properties of the hot-melt sealant mixture.

TABLE 6

| | |
| --- | --- |
| Instantaneous hardness (shore A) | 31 |
| Ultimate tensile stress (kg/cm$^2$) | 120 |
| Ultimate elongation (%) | 500 |
| Brookfield viscosity at 180° C. (cps) | 2500 |
| Peeling off glass at 180° C. before immersion in water (g/2.5 cm) | 1500 |
| Peeling off glass after immersion in water for 1 week at 70° C. (g/2.5 cm) | 500 |
| Transparency | slightly turbid |
| Colour after UV exposure for 1500 h at 40° C. in weatherometer | slightly yellow |

EXAMPLE 5

By the method described in Example 1 but using:

| | | |
| --- | --- | --- |
| cyclohexane | 800 g | |
| sec. butyllithium | 0.06 g | |
| butadiene | 5 g | 1st addition monomers |
| styrene | 17 g | |
| tetrahydrofuran | 7 g | 2nd addition monomers |
| butadiene | 55 g | |
| styrene | 16 g | 3rd addition monomers | a copolymer is synthesized having the characteristics given in Table 7.

TABLE 7

| | Styrene weight % | MW × $10^{-3}$ | Butadiene % 1,2 units |
| --- | --- | --- | --- |
| BSBS | 33 | 100 | 38.5 |

The copolymer described in Table 7 is hydrogenated in a reactor fitted with a device which ensures continuous hydrogen passage through the polymeric solution. Unreacted hydrogen is continuously recycled to the reactor base.

Using this process, 100 g of the parent polymer (Table 7) dissolved in 600 g of n-hexane are hydrogenated (degree of hydrogenation 99%) in 45 minutes operating at 700 p.s.i. within a temperature range of 50°–105° C. in the presence of 0.6 g of nickel naphthenate and 0.8 g of AlEt$_3$ (the catalyst being previously prepared in 5 ml of cyclohexane).

The polymeric solution containing the hydrogenated copolymer is washed with 300 cc of H$_2$O containing 0.2 g of phosphoric acid to remove the catalyst residue.

After washing, 0.6 g of 2,6-ditert.butyl-4-methylphenol anti-oxidant are added to the polymeric solution and the polymer is recovered by evaporating the cyclohexane in a current of steam. The hydrogenated copolymer is finally dried in a vacuum oven at 60° C. for 24 hours.

EXAMPLE 6

Isotactic polypropylene of MW 400,000 and the copolymer of example 5 are mixed together in a two-screw extruder at a temperature of 190° C. in various weight ratios as given in Table 8.

The polymer mixtures obtained are compression-moulded at 220° C. to form test pieces for the determination of certain technical properties, the results of which are shown in Table 8.

TABLE 8

| Mixture | 1 | 2 | 3 | 4 |
|---|---|---|---|---|
| Copolymer of Ex. 5 (weight %) | 0 | 100 | 50 | 25 |
| Polypropylene (weight %) | 100 | 0 | 50 | 75 |
| Ultimate elongation (%) | 860 | 770 | 725 | 715 |
| Ultimate tensile stress (kg/cm$^2$) | 400 | 300 | 485 | 410 |
| Modulus at 300% (kg/cm$^2$) | 40 | 260 | 130 | 180 |
| Yield strength (kg/cm$^2$) | 320 | | 90 | 195 |
| Hardness (Shore D) | 70 | 38 | 51 | 65 |
| Notched Izod, at 23° C. (kg · cm/cm) | 4.7 | no break | no break | no break |

We claim:

1. A linear copolymer having four alternating blocks, represented by the formula:

$$B_1-T-A_1-B_2-A_2$$

wherein A$_1$ and A$_2$ are both polyvinylaromatic blocks and the weight-average molecular weight of A$_1$ is from 0.25 to 2.0 times the weight-average molecular weight of A$_2$; B$_1$ is an ethylene-butene-1 copolymer and B$_2$ is an ethylene-propylene copolymer and the weight-average molecular weight of B$_1$ is from 0.05 to 0.5 times the weight-average molecular weight of B$_2$; and T is a terpolymer segment derived from statistically linked vinylaromatic units selected from the group consisting of ethylene-propylene-vinylaromatic monomer and ethylene-butene-1-vinylaromatic monomer; and wherein said linear copolymer comprises from 10 to 60 weight percent vinylaromatic units and has a weight-average molecular weight of from 20,000 to 300,000.

2. A linear copolymer as defined in claim 1, wherein the weight-average molecular weight of A$_1$ is from 0.5 to 1.5 times the weight-average molecular weight of A$_2$; the weight-average molecular weight of B$_1$ is from 0.07 to 0.3 times the weight-average molecular weight of B$_2$; and said linear copolymer has a weight-average molecular weight of from 30,000 to 200,000.

3. A linear copolymer as defined in claim 2, wherein said linear copolymer has a weight-average molecular weight of from 50,000 to 150,000.

4. A linear copolymer as defined in claim 3, wherein the weight-average molecular weight of B$_1$ is from 0.1 to 0.2 times the weight-average molecular weight of B$_2$.

5. A linear copolymer as defined in claim 2, wherein the weight-average molecular weight of A$_1$ is from 0.5 to 1.0 times the weight-average molecular weight of A$_2$.

6. A linear copolymer as defined in claim 1, wherein said T terpolymer segment comprises from 3 to 20 weight percent of the total linear copolymer.

7. A linear copolymer as defined in claim 1, wherein A$_1$ and A$_2$ are polystyrene blocks.

8. A linear copolymer as defined in claim 1, wherein said linear copolymer comprises 30 to 40 weight percent vinylaromatic units.

* * * * *